2,933,399

TREATMENT OF PROCESSED ANIMAL TISSUE

John T. R. Nickerson, Somerville, Mass., and Lawrence D. Starr, Kansas City, Mo.; said Nickerson assignor to Dirigo Sales Corporation, Boston, Mass., a corporation of Massachusetts No Drawing. Application April 5, 1956
Serial No. 584,158

(Filed under Rule 47(a) and 35 U.S.C. 116)

12 Claims. (Cl. 99—222)

This invention relates to the treatment of processed animal tissue, which term, as herein used, connotes such products as fresh pork and beef sausage, hamburger, fresh fish fillets and lightly smoked and lightly salted fish, such as finnan haddie or smoked fillets, eviscerated and cut poultry, etc., all of which are susceptible to bacterial decomposition and oxidative rancidity even when refrigerated.

In preparing processed animal tissue, whether by grinding, mixing, filleting, cutting or otherwise, it is a practical impossibility to prevent contamination and the consequent development of micro-organisms which produce decomposition and putrefaction; and with certain types of fatty tissue the exposure to the atmosphere also promotes oxidative rancidity, the rate of deterioration being more or less dependent upon the extent of surface exposed and contaminated. For example, ground meat or ground meat mixtures present a greater problem than sides or rounds; filleted fish and cut poultry present a greater problem than whole fish or whole New York dressed poultry because of the greater surface area that is exposed and contaminated. Fresh pork sausage is a typical processed product subject both to putrefaction and oxidative rancidity and its shelf or storage life at refrigerator temperatures above freezing is usually but five or six days, after which it undergoes perceptible deterioration rendering it unfit for human consumption. If great care has not been exercised in handling such foods the shelf or storage life is greatly lessened with a consequent high economic loss, particularly with frozen pork.

Insofar as oxidative rancidity is concerned anti-oxidants have been effective, both the fat-soluble type such as butylated hydroxy anisole (BHA), butylated hydroxy toluene (BHT), catechin, quercetin, and 2,6-dimethyoxyphenol (DMP), and the water-soluble or synergistic type, such as ascorbic acid, citric acid and phosphoric acid, either singly or in combination. However, it has been shown that such anti-oxidants have little or no effect in inhibiting the growth of those decomposing and putrefaction-producing bacteria that are mainly responsible for the short storage or shelf life of processed tissue; and it has been found that bactericidal agents while inhibiting the growth of putrefaction-producing bacteria often facilitate oxidative rancidity since they prevent the production of reducing substances formed by bacterial growth.

The principal objects of the present invention are to provide a process whereby the shelf or storage life of processed animal tissue may be greatly prolonged and to provide a process which not only inhibits the growth of decomposing and putrefaction-producing bacteria, but which does not promote oxidative rancidity.

Further objects will be apparent from a consideration of the following disclosure and specific examples of illustrative procedures.

We have discovered that when a relatively small amount of sorbic acid, and/or a water-soluble sorbic acid salt is applied to the exposed surface of fresh animal tissue, together or in conjunction with an anti-oxidant, that the growth of decomposing and putrefaction-producing bacteria is not only inhibited at refrigerator temperatures above freezing, but that sorbic acid and its water-soluble salts, unlike certain bactericidal agents such as chlorine and hydrogen peroxide, do not interfere with the action of anti-oxidants used in preventing oxidative rancidity, or in any way adversely affect the appearance, color or palatabiility of the processed tissue. In other words, anti-oxidants and sorbic acid, its water-soluble salts and esters, when used in conjunction, are synergetic in that neither interferes with the effectiveness of the other and both cooperate to inhibit deterioration of mechanically processed fresh animal tissue.

In accordance with the present invention sorbic acid, and/or a water soluble salt or ester, or a mixture thereof, hereinafter referred to as the "sorbic acid compound," together with an anti-oxidant, are applied to, mixed with, or otherwise incorporated in the processed tissue so as to come in contact with the exposed surfaces. The amount of sorbic acid compound may vary from a minimum of approximately 0.03%, based on the weight of the processed animal tissue under treatment, to a practical maximum which need not exceed 0.3%. Although greater amounts may be used, little if anything is to be gained. The sorbic acid compound may be used as a dry powder, an aqueous solution or an aqueous dispersion.

The method of incorporation of the sorbic acid compound will depend on the particular type or character of the tissue. For example, with mixtures such as pork sausage which contain seasoning, the dry sorbic acid compound along with the anti-oxidant may first be mixed with the spice or seasoning which is later incorporated with the pork trimmings. Fresh fish fillets, eviscerated and cut poultry may be sprayed with or immersed in an aqueous solution and/or dispersion of a mixture of the sorbic acid compound and anti-oxidant for a period of time sufficient to permit the exposed surfaces to absorb the desired amount. The preferred procedure in treating filleted fish, eviscerated and cut poultry comprises either applying to the exposed surfaces or immersing the cut tissue in an aqueous medium or solution containing from 0.1 percent to 5.0 percent of a sorbic acid compound and up to 0.2 percent of an anti-oxidant, which may be either a water- or fat-soluble type, for a period of from two minutes to 0.1 minute. In preparing hamburg and beef sausage the requisite amount of a mixture of the anti-oxidant and the dry sorbic acid compound may be sprinkled on or applied to the exposed surface of the beef prior to grinding, but if desired the sorbic acid compound and anti-oxidant may first be mixed with a suitable carrier so as to assure greater or more uniform distribution.

Where a synergistic or water-soluble anti-oxidant is to be used in conjunction with one or more fat soluble types, an aqueous dispersion may be prepared by dissolving the anti-oxidants in an emulsifier of the sorbitan derivative type, or in propylene glycol, then adding the solution to water containing the sorbic acid compound and dispersing. In either case the resulting solution or dispersion may be added to cut-up pieces of the animal tissue prior to grinding, but in the case of fish fillets, cut poultry, etc., they may be sprayed with or immersed in the dispersion.

The amount of fat soluble anti-oxidants, i.e., diphenols or compounds of similar electron configuration, may vary from a minimum of the order of 0.005% based on the weight of animal tissue, to the limit of common or practical usage which is of the order of 0.05%; and the same is true for the water-soluble or synergistic type anti-oxidants, although as a practical matter it might be desirable to use the latter type in somewhat higher concentrations, e.g., up to 0.2%, but when the fat-soluble and water-soluble types are used together, lesser amounts of each are generally employed. The following table shows typical anti-oxidant formulations:

|  | A | B | C | D | E | F |
|---|---|---|---|---|---|---|
| BHA [1] ............percent.. | 0.01 | 0.01 | 0.01 |  |  |  |
| BHT [1] ............do.... | 0.01 | 0.01 | 0.01 |  |  |  |
| DMP [1] ............do.... |  |  |  | 0.01 |  |  |
| Catechin............do.... |  |  |  |  | 0.01 |  |
| Quercetin............do.... |  |  |  |  | 0.01 |  |
| Propylene Glycol [1]..do.... |  | 0.1 |  |  |  |  |
| Sorbitan Trioleate [1]..do.... |  |  | 0.1 |  |  |  |
| Ascorbic Acid..........do.... |  |  |  |  |  | 0.1 |
| Citric Acid............do.... | 0.005 | 0.005 | 0.005 | 0.005 | 0.005 |  |

[1] Formulations in which the indicated ingredients were dissolved in fat.

In each of the above formulations phosphoric acid, ascorbic acid or the like may be substituted for the citric acid without materially interfering with the effectiveness of the anti-oxidant mixture; and other fat soluble anti-oxidants such as propyl gallate, nor dihydro guaiuretic acid (NDGA), etc., may be substituted.

In all cases the incorporation of the sorbic acid compound and anti-oxidant is not only effective to inhibit both the growth of decomposing and putrefaction-producing bacteria and oxidative rancidity, but also produces no adverse effect on the palatability and color of the tissue. As the result the shelf or storage life at refrigerator temperatures above freezing is considerably prolonged.

Illustrative procedures of our process are as follows:

Example 1

A 50 pound block of frozen pork containing about 50% fat and 50% lean trimmings was defrosted at 36-38 degrees F. and cut up into small pieces. The cut trimmings were then mixed with a seasoning having the following composition:

|  | Percent |
|---|---|
| Salt (NaCl) | 1.5 |
| Black pepper | 0.375 |
| Rubbed sage | 0.125 |
| Dextrose | 0.15 |

The mixture was then passed through a meat grinder having a 1/8 inch plate.

In the case of the test batch 0.01% BHA and 0.01% DMP were added to the seasoning along with 0.1% sorbic acid, but with the control batch the sorbic acid was omitted. For test purposes sample patties of both batches were made and put into sterile petri dishes for storage at 40-43° F. Taste tests, peroxide number tests (Stansby) and standard plate count tests were run prior to storage and periodically thereafter. No appreciable change in taste was noted after a period of two weeks in samples containing sorbic acid, BHA and BHT, and there was no increase in the peroxide number. The standard plate count tests were as follows:

| Days in Storage | Standard Plate Count Bacteria Per Gram | |
|---|---|---|
|  | Control | Test |
| 1 | 140,000 | 80,000 |
| 3 | 200,000 | 90,000 |
| 5 | 720,000 | 13,000 |
| 9 | 33,000,000 | 23,000 |
| 12 | 50,000,000 | 66,000 |
| 14 | 57,000,000 | 140,000 |

Substantially identical results were attained when the test batch also included 0.005% citric acid.

Examples 2-4

The procedure set forth in Example 1 was repeated except for the amounts of sorbic acid and the type antioxidants, as indicated by the following table:

|  | Sorbic Acid | DMP | BHT | BHA |
|---|---|---|---|---|
| Example 2 ..........percent.. | 0.05 | 0.01 | 0.01 |  |
| Example 3 ..........do.... | 0.05 |  | 0.01 | 0.01 |
| Example 4 ..........do.... | 0.10 |  | 0.01 | 0.01 |

The same tests were made as in Example 1 and the results of the taste and peroxide numbers were approximately the same as those of Example 1.

The plate count tests were as follows:

| Days' Storage | Standard Plate Count, Bacteria Per Gram | | | |
|---|---|---|---|---|
|  | Control | Example 2 | Example 3 | Example 4 |
| 1 | 140,000 | 81,000 | 87,000 | 60,000 |
| 3 | 200,000 | 150,000 | 86,000 | 69,000 |
| 5 | 720,000 | 220,000 | 150,000 | 100,000 |
| 9 | 33,000,000 | 2,900,000 | 1,400,000 | 270,000 |
| 12 | 55,000,000 | 14,000,000 | 2,000,000 | 740,000 |
| 14 | 57,000,000 | 23,000,000 | 16,000,000 | 1,700,000 |

Example 5

A quantity of beef with fat was ground through a plate with 3/8" holes three times to serve as the control ground beef. A second quantity of beef with fat was cut into cubes about 2 cubic inches in size. A mixture of 0.15% by weight of sorbic acid and 0.1% of anti-oxidant (formulation F) was then sprinkled over the cubed meat. This material was then ground through a plate with 3/8" holes three times. This served as the ground beef treated with sorbic acid.

Both the control ground beef and the beef treated with sorbic acid were held at 36-40° F. over a period of 8 days. Bacterial counts and organoleptic observations were made after 3, 5 and 8 days of holding under refrigeration, and the results are indicated in the following:

| Sample | Time Held, days | Odor | Standard Plate Count, Bacteria Per Gram |
|---|---|---|---|
|  |  |  | Average |
| Plain ground beef | 3 | Slightly Off | 25,000,000 |
| Ground beef with sorbic acid, anti-oxidant mixture | 3 | No off odor | 23,000 |
| Plain ground beef | 5 | Sour | 260,000,000 |
| Ground beef with sorbic acid, anti-oxidant mixture | 5 | No off odor | 130,000 |
| Plain ground beef | 8 | Very sour | 9,000,000,000 |
| Ground beef with sorbic acid, anti-oxidant mixture | 8 | No off odor | 390,000 |

Example 6

The same procedure as set forth in Example 5 was followed, except that anti-oxidant formulation A was substituted in place of anti-oxidant formulation F, and similar results were observed by macroscopic and sensory examination.

Example 7

A fish fillet from one side of a haddock was washed and placed in storage at 36-40° F. to serve as a control and the fillet from the other half of the haddock was immersed for 30 seconds in a dispersion comprising 0.25% of sodium sorbate, 0.25% of sorbic acid and 0.2% of ascorbic acid as the anti-oxidant. Both control and treated samples were held at 36-40° F. for a period of 8 days. Bacterial counts and organoleptic observations were made after 3, 5 and 8 days of storage, and the results are indicated in the following:

| | Time Held, days | Odor | Standard Plate Count, Bacteria Per Gram |
|---|---|---|---|
| | | | Average |
| Plain Fillet | 3 | Fishy | 3,800,000 |
| Fillet treated with sorbic acid and sodium sorbate, anti-oxidant mixture. | 3 | Bland | 850,000 |
| Plain fillet | 5 | Stale | 15,000,000 |
| Fillet treated with sorbic acid and sodium sorbate, anti-oxidant mixture. | 5 | No off odor | 2,400,000 |
| Plain fillet | 8 | Very stale | 57,000,000 |
| Fillet treated with sorbic acid and sodium sorbate, anti-oxidant mixture. | 8 | Slightly stale | 16,000,000 |

A comparative summary of tests run on fresh pork sausage, which is typical of a processed animal tissue that readily undergoes deterioration, is as follows:

| Storage Period In Days | Average Standard Plate Count Per Gram In Millions | | | | | |
|---|---|---|---|---|---|---|
| | A | B | C | D | E | F |
| 1 | 1.9 | 2.6 | 2.8 | 1.7 | 1.5 | 2.0 |
| 4 | 1.9 | 13 | 22 | 1.8 | 1.5 | 1.6 |
| 7 | 2.4 | 61 | 76 | 2.7 | 1.4 | 1.6 |
| 11 | 21 | 180 | 170 | 29 | 12 | 37 |

| Storage Period In Days | Peroxide Number Determination On Fat (Millimoles of Peroxide Oxygen Per Kilogram) | | | | | |
|---|---|---|---|---|---|---|
| | A | B | C | D | E | F |
| 1 | 0.0 | 0.0 | 0.0 | 0.0 | 0.0 | 0.0 |
| 4 | 0.3 | 0.3 | 0.2 | 0.3 | 0.2 | 0.2 |
| 7 | 0.4 | 0.0 | 0.0 | 0.0 | 0.0 | 0.0 |
| 11 | 0.9 | 0.3 | 0.3 | 0.2 | 0.2 | 0.2 |
| 15 | 7.8 | 0.0 | 0.0 | 0.0 | 0.0 | 0.0 |

Key: A—Sorbic acid, no anti-oxidants. B—No sorbic acid, anti-oxidants. C—Control. D—Sorbic acid, anti-oxidants and propylene glycol. E—Sorbic acid, anti-oxidants and sorbitan trioleate. F—Sorbic acid, anti-oxidants.

Sample A was rancid and samples B and C were sour and putrid after eleven days of storage.

It will be noted from the foregoing that sorbic acid when acting alone inhibits bacterial growth, and that anti-oxidants have but little effect in inhibiting bacterial growth. When sorbic acid alone is added changes in color and the chemical composition of the fatty tissues due to oxidation will take place at a faster rate than with no sorbic acid due to the absence, under such conditions, of reducing substances produced by bacterial growth. For that reason it is necessary to have present both a compound which will inhibit bacterial growth and a compound which prevents oxidation of the components of a tissue of that type. Although deterioration during storage or shelf life is inevitable, it will be noted that the samples treated with both sorbic acid and anti-oxidant after eleven days storage compared favorably with the untreated sample after four days storage. Hence, the treatment herein disclosed is effective to prolong the storage or shelf life for a week or more.

It is to be understood that this disclosure is for the purpose of illustration and that various changes and modifications may be made without departing from the spirit and scope of the invention as set forth in the appended claims.

We claim:
1. In the treatment of processed animal tissue, the step of inhibiting oxidative rancidity and the growth of decomposing and putrefaction-producing bacteria, which comprises incorporating in said tissue from approximately 0.03% to approximately 0.3%, based on the weight of the tissue, of a sorbic acid compound and up to 0.2% of an anti-oxidant selected from the group consisting of the fat-soluble and water soluble types and mixtures thereof.

2. In the treatment of processed animal tissue, the step of inhibiting oxidative rancidity and the growth of decomposing and putrefaction-producing bacteria, which comprises incorporating in said tissue from approximately 0.03% to approximately 0.3%, based on the weight of the tissue, of a sorbic acid compound and up to 0.1% of a fat-soluble anti-oxidant.

3. The process set forth in claim 2, wherein up to 0.2% of a water-soluble anti-oxidant is incorporated in the treating mixture.

4. In the treatment of ground animal tissue, the step of inhibiting oxidative rancidity and the growth of decomposing and putrefaction-producing bacteria, which comprises adding to the tissue from approximately 0.03% to approximately 0.3%, based on the weight of the tissue, of a sorbic acid compound and up to 0.1% of a fat-soluble anti-oxidant.

5. The process set forth in claim 4, wherein up to 0.2% of a water-soluble anti-oxidant is incorporated in the treating mixture.

6. In the manufacture of fresh pork sausage the step of inhibiting oxidative rancidity and the growth of decomposing and putrefaction-producing bacteria which comprises adding to the sausage mix from approximately 0.03% to approximately 0.3%, based on the weight of the tissue, of a sorbic acid compound and up to 0.1% of fat-soluble, phenolic anti-oxidant.

7. In the manufacture of fresh pork sausage from a mixture composed of pork trimmings and seasoning, the step of inhibiting oxidative rancidity and the growth of decomposing and putrefaction-producing bacteria, which comprises mixing with the seasoning approximately 0.1%, based on the weight of the pork trimmings of sorbic acid, and approximately 0.02% of a fat-soluble anti-oxidant.

8. In the treatment of cut animal tissue of the type consisting of filleted fish, eviscerated and cut poultry, the step of inhibiting oxidative rancidity and the growth of decomposing and putrefaction-producing bacteria, which comprises applying to the exposed surfaces of the tissue an aqueous medium containing from 0.1 to 5.0% of a sorbic acid compound and up to 0.2% of a water-soluble anti-oxidant, for a period of from 2 to 1/10 minutes.

9. The process set forth in claim 8, wherein up to 0.2% of a fat-soluble anti-oxidant is incorporated in the treating mixture.

10. In the treatment of cut animal tissue of the type consisting of filleted fish, eviscerated and cut poultry, the step of inhibiting oxidative rancidity and the growth of decomposing and putrefaction-producing bacteria which comprises immersing the cut tissue in an aqueous solution containing from 0.1 to 5.0% of a sorbic acid compound and up to 0.2% of a water-soluble anti-oxidant for a period of from 2 to 1/10 minutes.

11. The process set forth in claim 10, wherein up to 0.2% of a fat-soluble anti-oxidant is incorporated in the treating mixture.

12. A food preservative composition effective to inhibit oxidative rancidity and the growth of decomposing and putrefaction producing bacteria in animal tissue comprising in combination a sorbic acid compound and an antioxidant selected from the group consisting of the fat-soluble and water-soluble types and mixtures thereof, the relative proportions being such that the addition of the combination to animal tissue will incorporate .03–.3 percent based on the weight of the tissue of the sorbic acid compound and up to 0.2 percent based on the weight of the tissue of the anti-oxidant.

References Cited in the file of this patent

UNITED STATES PATENTS

| | | |
|---|---|---|
| 2,379,294 | Gooding | June 26, 1945 |
| 2,491,646 | Coleman et al. | Dec. 20, 1949 |
| 2,511,802 | Hall | June 13, 1950 |
| 2,724,650 | Melnick | Nov. 22, 1955 |
| 2,760,868 | Thommen | Aug. 28, 1956 |

OTHER REFERENCES

"Food Engineering," August 1953, pp. 127 and 151, article entitled New Fungicide.